United States Patent [19]
Zancho

[11] Patent Number: 6,157,624
[45] Date of Patent: Dec. 5, 2000

[54] METHOD AND APPARATUS FOR LINKING TERMINALS USING PRIVATE SECONDARY SERVICE PATHS (PSSP) IN A SATELLITE COMMUNICATION SYSTEM

[75] Inventor: William Frank Zancho, Hawthorn Woods, Ill.

[73] Assignee: Motorola, Inc., Schaumburg, Ill.

[21] Appl. No.: 09/002,795

[22] Filed: Jan. 5, 1998

[51] Int. Cl.[7] .................................................. H04B 10/105
[52] U.S. Cl. ......................... 370/316; 370/342; 370/466
[58] Field of Search .................................. 370/316, 323, 370/342, 465, 466; 395/172, 200.6, 286, 831

[56] References Cited

U.S. PATENT DOCUMENTS

| | | | |
|---|---|---|---|
| 5,396,543 | 3/1995 | Beeson, Jr. et al. ...................... | 379/59 |
| 5,448,623 | 9/1995 | Wiedeman et al. ........................ | 379/59 |
| 5,504,935 | 4/1996 | Vercauteren ............................ | 455/33.2 |
| 5,526,404 | 6/1996 | Wiedeman et al. ........................ | 379/60 |
| 5,535,430 | 7/1996 | Aoki et al. .............................. | 455/54.1 |
| 5,640,386 | 6/1997 | Wiedeman ............................... | 370/320 |
| 5,903,837 | 5/1999 | Wiedeman ............................... | 455/427 |
| 5,915,217 | 6/1999 | Wiedeman et al. ..................... | 455/427 |
| 5,918,157 | 6/1999 | Wiedeman et al. ..................... | 455/13.1 |

*Primary Examiner*—Hassan Kizou
*Assistant Examiner*—Ahmed Elallam
*Attorney, Agent, or Firm*—James E. Klekotka

[57] ABSTRACT

Private Secondary Service Paths (PSSPs) between compatible or non-compatible communication terminals (110, 120) are established using terrestrial stations (130) within a satellite communication system (100). Each PSSP provides to its users the ability to establish communication paths between compatible or non-compatible terminals. A PSSP is established using terrestrial stations (130) which establish and maintain terrestrial-based links (115, 125) and satellite communication links (135). Terrestrial stations also perform frequency translating and data reformatting to allow non-compatible terminals to communicate with each other. All data can be sent between terminals over satellites (140), or user data can be sent via terrestrial connections (150) while overhead data is sent via satellites (140).

31 Claims, 5 Drawing Sheets

METHOD AND APPARATUS FOR LINKING TERMINALS USING PRIVATE SECONDARY SERVICE PATHS (PSSP) IN A SATELLITE COMMUNICATION SYSTEM

FIELD OF THE INVENTION

This invention relates generally to satellite communications and, more particularly, to a method and apparatus for linking terminals using Private Secondary Service Paths (PSSPs) in a satellite communication system.

BACKGROUND OF THE INVENTION

Large, multi-satellite communication systems are expensive to build and place into orbit. Because of the expense, it is desirable to fully utilize the space-based resources to provide revenue producing communication services to users and to minimize the amount of resources that are not providing services to users.

A "satellite" is defined herein to mean a man-made object or vehicle intended to orbit Earth and includes both geostationary and non-geostationary satellites. A "constellation" is defined herein to mean an ensemble of satellites arranged in orbits for providing specified coverage of a portion or all portions of the Earth. A constellation typically includes multiple rings (or planes) of satellites and can have equal numbers of satellites in each plane, although this is not essential. A constellation could include geostationary or non-geostationary satellites, or a combination of both.

In many instances, calls are made between subscriber units that belong to the same system. Generally, the subscriber units are compatible only with one type of communication system. For example, Global System Mobile (GSM) subscriber units require a GSM compatible base station, and Code Division Multiple Access (CDMA) subscriber units require a CDMA compatible base station. In order for these non-compatible subscriber units to be connected to each other, a terrestrial-based link must be established between base stations. This is not always possible to accomplish for a variety of reasons, some of which are politically motivated.

In prior art systems, communication resources are put into service based on predicted utilization from a number of system compatible users located around the world. Because these predictions, by their nature, are somewhat inaccurate, some system resources are under-utilized when system resources are allocated according to the predictions.

What are needed are a method and apparatus for allowing terminals to communicate with each other using system resources provided by a satellite communication system. Further, what are needed are a method and apparatus for allowing non-system-compatible terminals to use system resources to increase the revenue generating utilization of a satellite communication system.

DETAILED DESCRIPTION OF THE DRAWINGS

Figure 1:
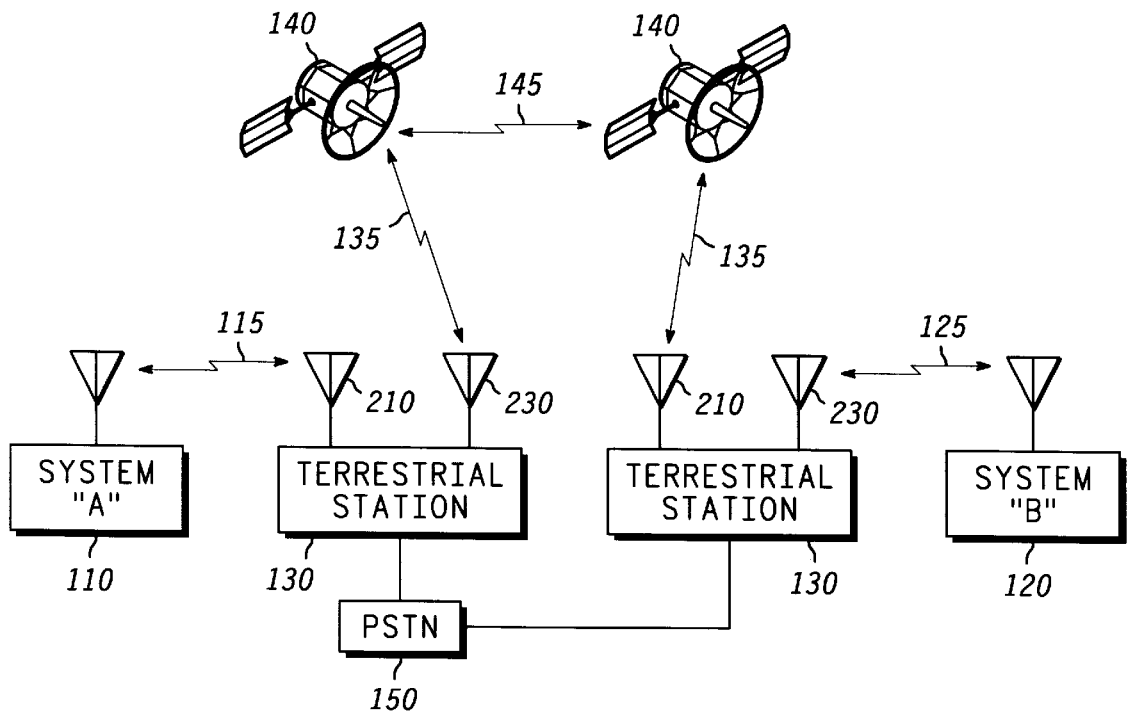
FIG. 1 shows a simplified block diagram of a satellite communication system within which the method and apparatus of the present invention can be practiced.

The method and apparatus of the present invention provide Private Secondary Service Paths (PSSPs) within a satellite communication system. Each PSSP provides to its users a private communication path through the satellite based communication system which could provide a secondary means for data and/or message transfer. The secondary path could carry overhead data (e.g., non-real time system traffic such as call setup, registration, and/or billing information) only, or could carry both overhead and user data (e.g., real-time voice traffic). The method and apparatus of the present invention enable a secondary path to be established between a pair of compatible or non-compatible terminals.

In a preferred embodiment, this is implemented in a system having a constellation of crosslinked satellites and a number of substantially stationary terrestrial stations. Desirably, terrestrial stations include gateways and/or network translators. Gateways and network translators can be co-located or remote from each other. In a preferred embodiment, network translators communicate with the satellite system using L-band links, and gateways communicate with the satellite system using K-band links, although they could communicate in different bands. Alternatively, gateways and network translators could communicate over the same link or same type of link.

Additional system resource utilization can occur and can be predicted when additional users are allowed to request data transfer sessions from a system. In addition, allowing non-system-compatible communication units access to the system resources for use in data transfer sessions adds to the revenue producing capacity of the system.

As used herein, a "Private Secondary Service Path" or "PSSP" is a path which is established between two terminals through a satellite communication system using at least one terrestrial station. Desirably, at least one of the terminals uses a communication format which is different than the communication format used by the satellite communication system. A PSSP is continuously maintained through the satellite communication system for a predetermined duration or until the system is notified that the path should be disconnected. In a preferred embodiment, the method and apparatus of the present invention allows data transfers to occur between non-compatible terminals. This provides an expanded customer base and provides users with an alternative path to use for data transfer sessions and also increases the amount of revenue-bearing data transfers through the system.

Because the topology of a satellite communication system is constantly changing, maintenance of a PSSP involves satellite-to-terrestrial station hand-offs and the starting and stopping of various inter-satellite crosslinks and/or bent-pipe links.

The method and apparatus of the present invention provides private, broad or narrow-band communications paths between two or more terminals. These terminals may be non-compatible, where the system provides a translation function. For example, a preferred embodiment of the method and apparatus of the present invention enables a GSM user to establish and maintain a communication path between a GSM compatible terminal and a CDMA compatible terminal.

The present invention is applicable to satellite communication systems that have earth-fixed, satellite-fixed, or both types of communication cells. Also, the present invention is applicable to satellite communication systems having one or more satellites in non-geostationary orbits, geostationary orbits, or both types of orbits around earth. A constellation of satellites implementing the method and apparatus of the present invention could include any number of satellites. The present invention is applicable to satellite communication systems having satellites which orbit the earth at any altitude or angle of inclination, including polar, equatorial, inclined or other orbital patterns. The present invention is applicable to systems providing full coverage of the earth, partial coverage, and/or multiple coverage of portions of the earth.

In a preferred embodiment, multiple separate frequency bands are supported by the terrestrial stations and satellites. Desirably, a PSSP is provided for a predetermined amount of time using one or more terrestrial stations which can be operated on different frequencies and can use different modulation formats.

A first terrestrial station establishes and maintains a first communication channel with a source terminal and a second communication channel with a communication satellite. The first communication channel uses a first set of operating frequencies and a first modulation format (e.g., terrestrial GSM or CDMA). The second communication channel uses a second set of operating frequencies and a second modulation format (e.g., the satellite system format). A second terrestrial station establishes and maintains a third communication channel with a destination terminal and a fourth communication channel with another one of the communication satellites. The third communication channel uses a third set of operating frequencies and either the first modulation format or a third modulation format. The fourth communication channel uses the second set of operating frequencies and the second modulation format (e.g., the satellite system format).

In a preferred embodiment, PSSP services are coordinated by a control center. In some cases, PSSPs are established automatically by a control center in cooperation with at least one terrestrial station. In other cases, communication system users can request PSSP services. That is, users can submit requests to have PSSPs established for them. A control center or terrestrial station evaluates the request and determines if adequate system resources are available. The control center could be a centralized or a dispersed control function. For example, a control center could be located in a dedicated control facility or in a system gateway or in a terrestrial station. Alternatively, functions performed by a control center could be dispersed throughout a system. In such an embodiment, control facilities, terrestrial stations, system gateways, satellites, and other devices all could participate in providing the control function.

FIG. 1 shows a simplified block diagram of a satellite communication system within which the method and apparatus of the present invention can be practiced. Satellite communication system 100 includes system "A" compatible terminals 110, system "B" compatible terminals 120, communication satellites 140, and a number of terrestrial stations 130 which can comprise gateways and/or network translators.

System "A" compatible terminals 110 include, for example, single user fixed or mobile communication devices and multi-user communication devices. System "A" compatible terminals 110 are configured to operate using a format compatible with system "A", for example GSM compatible terminals. System "A" compatible terminals 110 communicate with terrestrial station 130 using radio frequency (RF) links 115 which are compatible with system "A".

In addition, system "B" compatible terminals 120 include, for example, single-user fixed or mobile communication devices and multi-user communication devices. System "B" compatible terminals 120 are configured to operate using a format compatible with system "B", for example CDMA compatible terminals. System "B" compatible terminals 120 communicate with terrestrial station 130 using radio frequency (RF) links 125 which are compatible with system "B". In some cases, system "A" and system "B" use compatible formats, but in other cases, the formats could be non-compatible.

In accordance with a preferred embodiment of the present invention, pairs of compatible or non-compatible terminals are coupled together using terrestrial stations which include, if necessary, network translators. One or more terrestrial station is used to form a PSSP. Through PSSPs, system "A" compatible communication terminals 110 can privately communicate with other system "A" terminals 110 and/or system "B" terminals 120 without necessarily supporting the same communications protocols as system "B" terminals 120 and/or satellites 140. The below-discussed features of a preferred embodiment of the present invention can be practiced using any number of communication terminals 110 and 120, and any number of terrestrial stations 130 within satellite communication system 100.

Terrestrial stations 130 communicate with communication satellites 140 using RF communication links 135. In a preferred embodiment, communication satellites 140 communicate with other communication satellites 140 using crosslinks 145. Terrestrial stations may also communicate with system control centers (not shown) using terrestrial links or links established through communication satellites 140. In an alternate embodiment, terrestrial stations also communicate with each other over terrestrial links which can include (but would not necessarily include) one or more Public Switched Telephone Networks (PSTN) 150.

Links 115, 125, 135, and 145 utilize a limited portion of the electromagnetic spectrum that is divided into numerous channels. Channels supported on links 115, 125, 135, and 145 can use Frequency Division Multiple Access (FDMA), and/or Time Division Multiple Access (TDMA), and/or Code Division Multiple Access (CDMA) communications techniques or combinations thereof. Those skilled in the art will recognize that any of links 115, 125, 135, and 145 can be uni-directional in either direction or bi-directional.

Links 135 desirably include one or more broadcast channels. Terrestrial stations 130 can synchronize with and monitor at least one broadcast channel to detect data messages which are addressed to them or the communication terminals they support. Terrestrial stations 130 can transmit messages to communication satellites 140 over one or more acquisition channels provided within links 135. Broadcast channels and acquisition channels are not dedicated to any one user but are shared by all users currently within view of a satellite 140. Broadcast channels and acquisition channels are used by terrestrial stations 130 to establish PSSPs between communication terminals such as 110 and 120.

Terrestrial stations 130 are responsible for reformatting data packets, when necessary, using network translators which can be co-located with or remote from terrestrial stations 130. Terrestrial stations 130 can receive and process data packets using one format and then process and transmit the packets using a second format. In a preferred embodiment, terrestrial stations 130 can also include encryption and decryption devices to provide users with additional levels of data security.

Communication satellites 140 are responsible for routing data packets through the system. In a preferred embodiment, communication satellites 140 communicate with other communication satellites 140 using crosslinks 145. Via these crosslinks 145, data from terrestrial stations 130 located at any point on or near the surface of the earth can be routed through satellites 140 of the constellation to within range of substantially any other point on the surface of the earth. In alternate embodiments, satellites 140 could communicate with each other using bent-pipe links to other satellites and/or to various points on the surface of the earth.

Terrestrial stations 130 can be located anywhere on the surface of the earth or in the atmosphere above the earth. Terrestrial stations 130 can be used by a single user or multiple users. Terrestrial stations 130 could communicate with wireless terminals and/or terminals connected to conventional terrestrial systems, such as PSTNs. Terrestrial stations 130 preferably simultaneously transmit data to and receive data from communication satellites 140 on multiple channels within uplinks and downlinks.

Terrestrial stations 130 can perform call-processing tasks, hand-off tasks, and registration tasks in conjunction with establishing uplinks and downlinks with communication satellites 140. Terrestrial stations 130 can also perform call-processing tasks, hand-off tasks, and registration tasks in conjunction with establishing links with communication terminals such as 110 and 120. In a preferred embodiment, single or multiple users can access a PSSP in satellite communication system 100 through terrestrial stations 130. Typically, terrestrial stations 130 perform system level functions, such as providing some control commands.

In a preferred embodiment, communication satellites 140 reside in non-geostationary orbits. In non-geostationary orbits, satellites 140 can move at high speeds relative to any given point on the surface of the earth. Because of the relative movement between the communication satellites and terrestrial stations, each satellite-to-terrestrial station communication link is a temporary one. In accordance with a preferred embodiment, hand-off schemes are employed to establish and maintain a PSSP for a transient and/or predetermined length of time. In alternate embodiments, satellites 140 could reside in geostationary orbits or combinations of non-geostationary and geostationary orbits.

For illustration purposes only, FIG. 1 shows a limited number of satellites 140, one system "A" terminal 110, one system "B" terminal 120, two terrestrial stations 130, and two satellites 140. A system incorporating the method and apparatus of the present invention could have any number of satellites 140, a plurality of system "A" terminals 110, a plurality of system "B" terminals 120, and a plurality of terrestrial stations 130. In addition, such a system could support numerous other communication units of various types and degrees of mobility.

Figure 2:
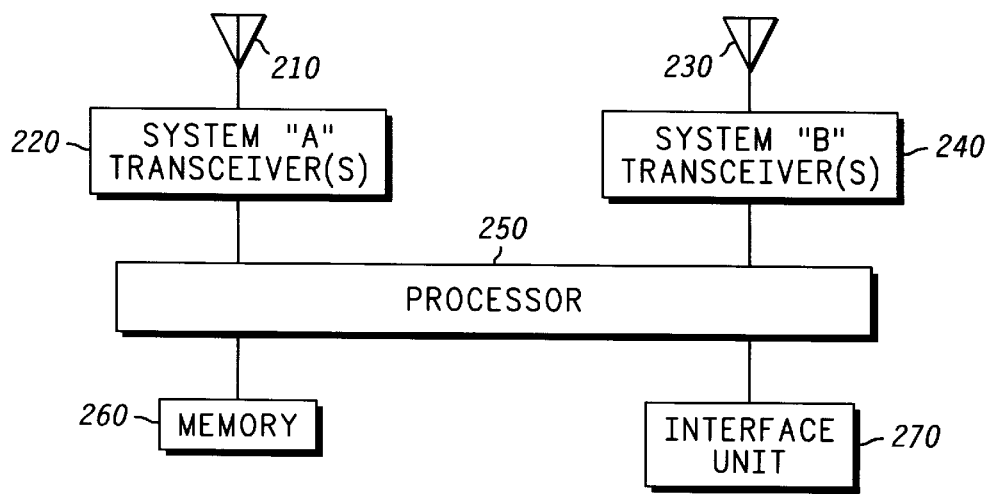
FIG. 2 illustrates a simplified block diagram of a generalized terrestrial station in accordance with a preferred embodiment of the present invention.

FIG. 2 illustrates a simplified block diagram of a generalized terrestrial station 130 in accordance with a preferred embodiment of the present invention. Generalized terrestrial station 130 can support a single user or multiple simultaneous users.

In a preferred embodiment, terrestrial station 130 comprises terrestrial-based system antenna 210, terrestrial-based system transceiver 220, satellite communication system antenna 230, satellite communication system transceiver 240, processor 250, memory device 260, and interface unit 270. In an alternate embodiment, terrestrial-based system antenna 210 and terrestrial-based system transceiver 220 can be part of a base station.

Terrestrial-based system antenna 210 is used to establish links with terrestrial-based communications terminals. Terrestrial-based system antenna 210 is coupled to terrestrial-based system transceivers 220. In the receive mode, terrestrial-based system transceivers 220 perform the functions of frequency down-conversion, filtering, and demodulation to obtain digital data which is sent to processor 250. In the transmit mode, terrestrial-based system transceivers 220 perform the functions of frequency up-conversion, filtering, amplification, and modulation.

Satellite communication system antenna 230 is used to establish links with satellites 140 (FIG. 1). Satellite communication system antenna 230 is coupled to satellite communication system transceivers 240. In the receive mode, satellite communication system transceivers 240 perform the functions of frequency down-conversion, filtering, and demodulation to obtain digital data which is sent to processor 250. In the transmit mode, satellite communication system transceivers 240 perform the functions of frequency up-conversion, filtering, amplification, and modulation.

When terrestrial station 130 is used to support a single user, only a single antenna 210 and transceiver 220 are typically present. When terrestrial station 130 is used to support multiple simultaneous users, antenna 210 and transceiver 220 could support the multiple users or a number of antennas 210 and transceivers 220 could be present. Thus, in alternate embodiments, terrestrial station 130 could have any number of antennas and transceivers.

Processor 250 desirably carries out some portions of the method of the present invention, described below. Processor 250 generally controls and manages system and user access for terrestrial station 130, message reception and transmission, reformatting, channel set-up, radio tuning, frequency, time slot and/or code assignment, and other communication and control functions. This could include procedures for determining protocols for secondary path establishment and maintenance and other associated functions as described below. In addition to performing other tasks as appropriate, processor 250 desirably stores results from such procedures in memory device 260.

Interface unit 270 is coupled to processor 250 and is used to perform interface functions. Processor 250 translates data from terrestrial system formats to satellite system formats and vice versa. Processor 250 sends digital data to interface unit 270 and receives digital data from interface unit 270. Interface unit 270 can be used to communicate with other terrestrial stations, systems and/or subsystems. In some cases, subsystems can provide user inputs and outputs.

In an alternate embodiment, overhead data (e.g., call setup, registration, and billing) is sent from the source to destination terrestrial station via the satellite network and user data (e.g., voice or facsimile data) is sent via terrestrial networks (e.g., conventional PSTNs).

For clarity and ease of understanding, FIG. 2 illustrates two antennas 210, 230 and associated transceivers 220, 240, one processor 250, one memory device 260, and one interface unit 270. In alternate embodiments, any number of these components could be used. For example, multiple processors could be used to perform various functions, such as processing different communication formats. In addition, some of the processing and/or memory devices could be remotely located. The number of antennas 210, 230 and transceivers 220, 240 could depend on the number of system types for which format translations and communications are to be provided.

Figure 3:
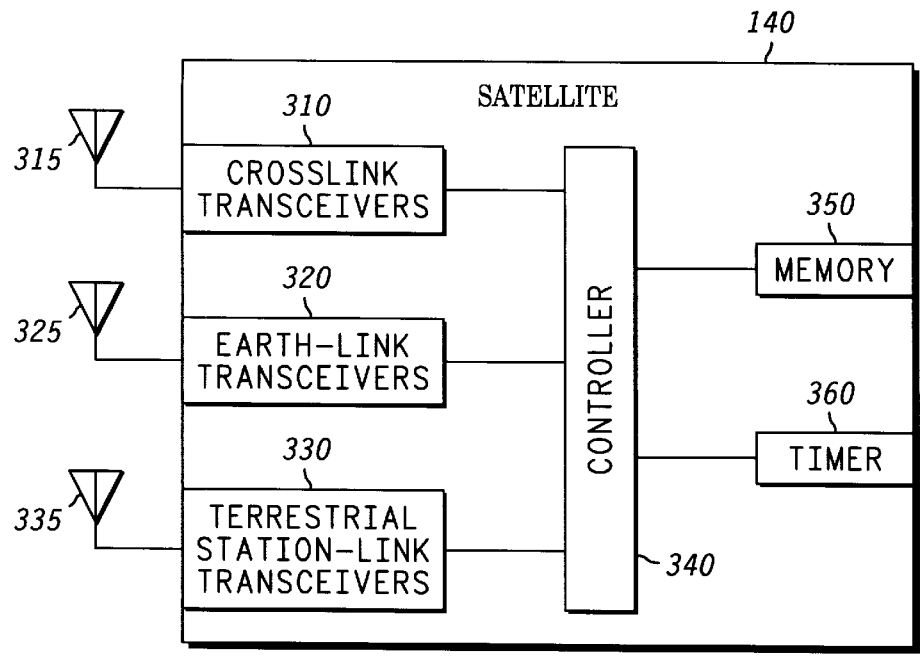
FIG. 3 shows a simplified block diagram of a satellite in accordance with a preferred embodiment of the present invention.

FIG. 3 illustrates a simplified block diagram of a satellite 140 (FIG. 1) in accordance with a preferred embodiment of the present invention. Preferably, many or all satellites 140 within system 100 (FIG. 1) include equipment as illustrated by the block diagram of FIG. 3. Satellite 140 desirably includes crosslink transceivers 310, earth-link transceivers 320, terrestrial station-link transceivers 330, crosslink antennas 315, earth-link antennas 325, terrestrial station-link antennas 335, controller 340, memory device 350, and timer 360.

Crosslink transceivers 310 and crosslink antennas 315 support crosslinks to other in-range satellites 140. In an alternate embodiment, transceivers supporting bent-pipe links could alternatively or additionally be used. Earth-link transceivers 320 and earth-link antennas 325 support links with system gateways and other terrestrial-based devices such as control centers and terrestrial stations. Terrestrial station-link transceivers 330 and terrestrial station-link antennas 335 support single user and multiple user links with single and multi-user terrestrial stations. Preferably, each satellite 140 can simultaneously support a number of terrestrial station-links with terrestrial stations.

Controller 340 is coupled to each of transceivers 310, 320, and 330 as well as to memory device 350 and timer 360. Controller 340 could be implemented using one or more processors. Controller 340 uses timer 360 to monitor and to maintain, among other things, knowledge of a synchronized system time. Memory device 350 stores data that serve as instructions to controller 340 and that, when executed by controller 340, cause satellite 140 to carry out particular aspects of the method of the present invention, as will be discussed in detail below. In alternate embodiments, the present invention could be carried out without satellite 140 performing particular steps defining the present invention. In addition, memory device 350 desirably includes variables, tables, and databases that are manipulated during the operation of satellite 140.

Controller 340 can receive data packets from and/or send data packets to any one of transceivers 310, 320, and 330. Single data packets and/or multiple data packet groups may be received, transmitted and processed by satellite 140. After receipt of at least one data packet, controller 340 routes the packet. In a preferred embodiment, the routing decision depends on routing tables stored in memory device 350 and/or on a data packet type.

For clarity and ease of understanding, FIG. 3 illustrates one controller 340, one memory device 350, one timer 360, one crosslink antenna 315 and associated transceiver 310, one earth-link antenna 325 and associated transceiver 320, and terrestrial station-link antenna 335 and associated transceiver 330. In alternate embodiments, any number of these components could be used. The number of antennas 315, 325, 335 and transceivers 310, 320, 330, for example, could depend on the number of bands within which communications are to be provided and the number of communications terminals that satellite 140 communicates with.

Figure 4:
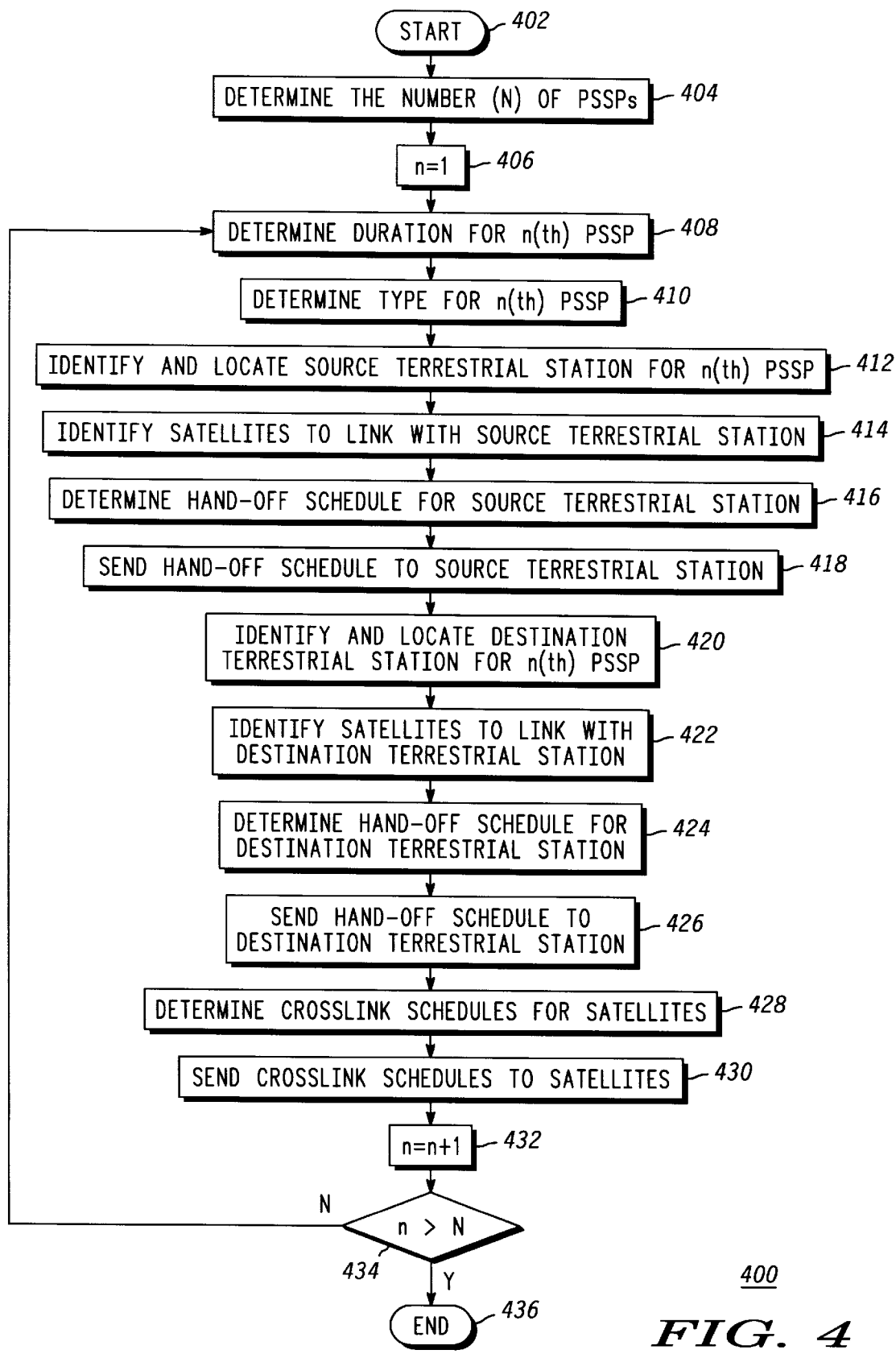
FIG. 4 illustrates a flowchart of a method for determining operational parameters for at least one PSSP within a satellite communication system in accordance with a preferred embodiment of the present invention.

FIG. 4 illustrates a flowchart of a method for determining operational parameters for at least one PSSP within a satellite communication system in accordance with a preferred embodiment of the present invention. Procedure 400 starts with step 402. Initiation of procedure 400 can be the result of a communication system user requesting at least one PSSP to be established or initiation can be the result of a system command to set up at least one PSSP.

In step 404, a number (N) of PSSPs and the associated terrestrial stations that are required to establish the (N) PSSPs for this particular application are determined. The number of PSSPs could be numerous or could be as few as a single PSSP. For example, a group of GSM system users might request that secondary paths be established among them. PSSP requirements could change based on the time of day or other user preferences. For example, GSM users might periodically want to start and stop secondary paths based on their work schedules.

In an alternate embodiment, a single call support service for non-compatible users could be provided using one or more terrestrial stations. Typically, this is not cost effective. In this case, system resources (e.g., terrestrial stations) are under utilized, and the operating costs associated with them cannot be recovered.

In step 406, a counting variable, n, is initialized to one. The counting variable is the variable that is used to control iterations of procedure 400. This counting variable is used to control the number of PSSPs established within this particular application. For each PSSP which must be established, steps 408 through 434 are performed in a preferred embodiment. In alternate embodiments, steps 408 through 434 could be performed in different orders or in parallel. In addition, although FIG. 4 illustrates an iterative loop, calculations for each PSSP could be performed in parallel as well. In some cases, only one terrestrial station is required.

In step 408, the duration for the nth PSSP is determined. Desirably, PSSP start (initiation) and stop (termination) times for the nth PSSP are determined. PSSP start and stop times could be absolute times, for example, or they could indicate times of day for periodic starting and stopping of the PSSP. In other words, a PSSP duration could include at least one periodic segment. In some cases, a user may be temporarily located in a region where the only service is provided by a network translator. This could cause random start and stop times to occur.

In an alternate embodiment, only the PSSP start time could be calculated, and the PSSP could be maintained indefinitely. In either embodiment, the method of the present invention could be used to establish a PSSP which has a duration that exceeds the duration of a single call. In these cases, the effect on the system of setup times, users validation times, and destination determination times is less.

In step 410, the type of PSSP is determined. PSSP types can be, for example, encrypted or non-encrypted. PSSPs could be unidirectional or bi-directional. PSSPs can be used to interconnect compatible or non-compatible terminals. Network translators can provide interfaces to a number of different systems. Such network translators interface with a minimum of two different packet formats. In a preferred embodiment, a network translator couples a first system to a second system. In this case, packets are received and transmitted by a network translator in a format which is compatible with the first system, and packets are also received and transmitted in another format which is compatible with the second system.

In a preferred embodiment, PSSPs can be established between compatible or non-compatible terminals. For example, a GSM compatible terminal can be connected to a non-GSM terminal using a PSSP in accordance with a preferred embodiment. In this example, one terrestrial station (network translator) is used to interface the GSM compatible terminal to the satellite communication system, and another terrestrial station (network translator) is used to interface the satellite communication system to the non-GSM compatible terminal. In this case, a satellite communication system provides the link between the two network translators.

In step 412, the identity and location of the source terrestrial station for the nth PSSP and the associated terminal are determined. In a preferred embodiment, the terrestrial station's capabilities and status are also determined. In a preferred embodiment, location information is based on the location for the source terrestrial station. This location information can be obtained from the satellite communication system or from a position locating system or other means.

In step 414, satellites which can provide communication links with the source terrestrial station are determined. This is done either for the entire duration of the nth path or for a portion of the duration. Desirably, system topology is predicted to determine the best beams and satellites to use for the links from the satellites to terrestrial stations. Loading predictions and/or schedules are also examined to determine if hand-offs will have to be made to ensure that the PSSP is maintained. More often, hand-offs occur on the links between satellites and terrestrial stations, but hand-offs can also occur on the links between terrestrial stations and the user terminals they are supporting.

In step 416, a source terrestrial station hand-off schedule is determined based on information derived in step 414. The source terrestrial station hand-off schedule describes the hand-offs (e.g., link start times, pointing angles, etc.) between the source terrestrial station and the linking satellites. If the duration of the PSSP will exceed the duration of the source terrestrial station's ability to communicate with a single satellite, hand-offs would be necessary to maintain the PSSP. In a preferred embodiment, terrestrial stations perform hand-offs from one satellite to another, and hand-offs are also performed between beams on a single satellite.

In a preferred embodiment, step 418 is then performed, during which the hand-off schedule is sent to the source terrestrial station. In alternate embodiments, the hand-off process could be transparent to the source terrestrial station and knowledge of the hand-off schedule would not be needed. In such embodiments, the linking satellites could control hand-off and the hand-off schedule could be sent to those satellites.

In step 420, the identity and location of the destination terrestrial station for the nth path is determined. The source terrestrial station and the destination terrestrial station cooperate together to form a PSSP. In a preferred embodiment, the destination terrestrial station's capabilities and status are also determined. In a preferred embodiment, location information is based on the location for the destination terrestrial station.

In step 422, satellites which can provide communication links with the destination terrestrial station are determined. This is done either for the entire duration of the nth path or for a portion of the duration. Similar to step 414, system topology is desirably predicted to determine the best beams and satellites to use for the satellite-to-destination terrestrial station link. Loading predictions or schedules are also desirably examined to determine if hand-offs will have to be made to ensure that the PSSP is maintained.

In step 424, a destination terrestrial station hand-off schedule is determined based on information derived in step 422. The destination terrestrial station hand-off schedule describes the hand-offs (e.g., link start times, pointing angles, etc.), if any, between the destination terrestrial station and the linking satellites.

In a preferred embodiment, step 426 is then performed, during which the hand-off schedule is sent to the destination terrestrial station. In alternate embodiments, the hand-off process could be transparent to the destination terrestrial station and knowledge of the hand-off schedule would not be needed. In such embodiments, the linking satellites could control hand-off and the hand-off schedule could be sent to those satellites.

In step 428, crosslink schedules are determined which include information which the linking satellites, and any intermediate satellites between the source and destination linking satellites, will use to maintain the PSSP for a duration of the nth PSSP or a portion of that duration. As the satellites move with respect to the source and destination terrestrial stations and also with respect to other satellites, different crosslinks will, of necessity, need to be established in order to maintain the PSSP between the source and destination terrestrial stations. A prediction of system topology during the duration of the PSSP, or a portion thereof, is used to determine the satellite crosslinks.

In step 430, the crosslink schedules are sent to the satellites. The satellites will use the crosslink schedules to control crosslink initiation and termination necessary to maintain the nth PSSP. In some scenarios, no intermediate satellites might be necessary between the source linking satellite and the destination linking satellite. In some scenarios, terrestrial-based devices might be necessary between the source linking satellite and the destination linking satellite. In other scenarios, the source linking satellite and the destination linking satellite could be the same satellite. In any of those scenarios, the determination and distribution of the crosslink schedules could be substantially simplified.

In step 432, the counting variable, n, is incremented by one, in order to set up the procedure for the next iteration (i.e., for the next PSSP calculations). In step 434, the counting variable, n, is compared to the total number, N, of PSSPs which are to be established for this particular application. When there are additional PSSPs, procedure 400 branches to step 408, and procedure 400 iterates as shown in FIG. 4. When all of the PSSPs have been determined, then procedure 400 branches to step 436 and ends. In an alternate embodiment, no counting variable could be used and steps 408–430 cold be executed on a demand basis for each desired PSSP.

As described above, in a preferred embodiment, satellites receive data from other satellites via crosslinks. In alternate embodiments, the method and apparatus of the present invention could be implemented in a system where satellites transfer data between themselves using "bent-pipe" links with terrestrial stations or other satellites. In such embodiments, the crosslink schedules described in conjunction with FIG. 4 would describe bent-pipe links rather than direct links between satellites.

In alternate embodiments, satellites cooperate with terrestrial stations to maintain PSSPs even when user data is not flowing across a particular PSSP. When user data is not flowing on a satellite-to-terrestrial station link, the available bandwidth could be used to exchange system control, billing information and/or link maintenance data relevant to the terrestrial station. Link maintenance data, for example, could be used to determine link quality and perform bit error checking.

In a preferred embodiment, both user data and overhead data are carried via satellites. In another alternate embodiment, satellites could be used predominantly to carry overhead data, but once the end-to-end link is established, substantially all user data could be carried between terrestrial stations via terrestrial links. In still another embodiment, overhead data could be carried via terrestrial links, and satellites could carry user data between the terrestrial stations.

Figure 5:
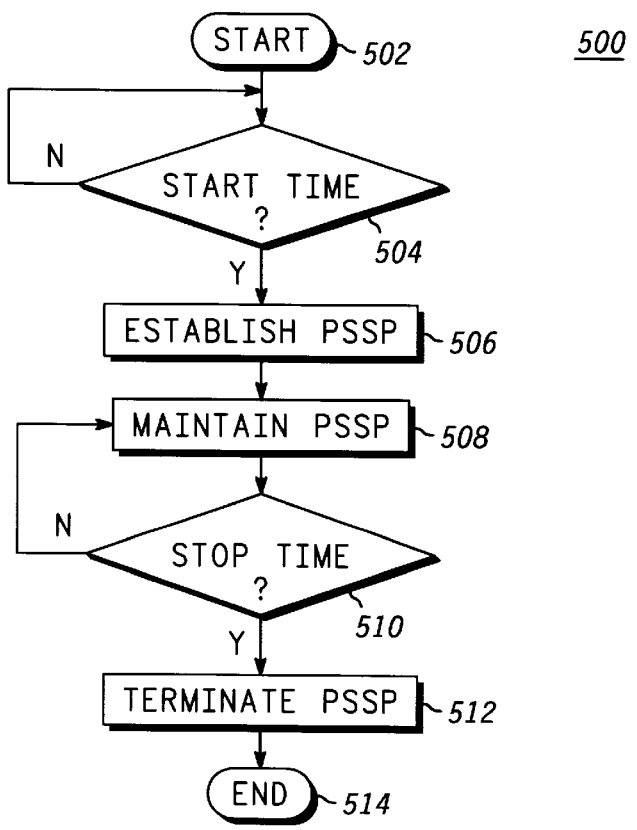
FIG. 5 illustrates a flowchart of a method for establishing and maintaining a PSSP within a satellite communication system in accordance with a preferred embodiment of the present invention.

FIG. 5 illustrates a flowchart of a method for establishing and maintaining a PSSP within a satellite communication system in accordance with a preferred embodiment of the present invention. Procedure 500 starts with step 502. Procedure 500 could be initiated when a terrestrial station is installed, or during terrestrial station turn-on procedures, and/or could be initiated at periodic intervals. Alternatively, procedure 500 could be initiated when a communication system user (e.g., a wireless communication unit or a PSTN terminal) requests a PSSP to be established, or it could be initiated as a result of a system command to set up a PSSP.

In step 504, a query is performed to determine when a PSSP start time is reached. In a preferred embodiment, satellites and/or terrestrial station store operational schedules and monitor the system time to determine when they are to begin the establishment of a scheduled PSSP. In alternate embodiments, operational schedules are stored at a control center.

In step 506, the satellite segment (i.e., links) for a scheduled PSSP is established between the source and destination terrestrial stations in accordance with information derived as described in conjunction with FIG. 4. PSSP establishment could be performed in a similar manner to call setup procedures currently known by those of skill in the art.

The source terrestrial station, destination terrestrial station, and satellites perform the functions necessary to establish the PSSP for the desired duration. These functions include, but are not limited to, establishing a link between the source terrestrial station and a source terminal, establishing a link between the source terrestrial station and a satellite, crosslink starting and stopping times, establishing a link between the destination terrestrial station and a destination terminal, establishing a link between the destination terrestrial station and a satellite, and establishing satellite crosslinks, if necessary. In an alternate embodiment, a terrestrial link is also established between the source and destination terrestrial station for transfer of user data.

In a preferred embodiment, terrestrial station link establishment and crosslink initiation and termination procedures are governed by schedules determined in accordance with the method described in conjunction with FIG. 4. In an alternate embodiment, terrestrial station link establishment and crosslink starting procedures could be controlled by a control center.

In an alternate embodiment, PSSP setup could include steps performed for the purpose of determining path quality. For example, a source terrestrial station could transmit a known initiation bit pattern to the destination terrestrial station, and the destination terrestrial station could receive the initiation bit pattern and transmit a confirmation bit pattern to the source terrestrial station. The confirmation bit pattern could include, for example, the results of a quality check performed by the destination terrestrial station on the initiation bit pattern. In one embodiment, when the link quality is unacceptable, then an alternate path is considered if one is available. In other cases, the system could continue to attempt alternate PSSPs for a number of iterations, or until a PSSP having an acceptable quality is established. In some cases, the PSSP start time is delayed.

In step 508, the source terrestrial station, destination terrestrial station, and satellites perform the functions necessary to maintain the PSSP for the desired duration. These functions include, but are not limited to, performing hand-off procedures between terrestrial stations and satellites, crosslink initiation and termination, and performing hand-off procedures between terrestrial stations and terminals. In a preferred embodiment, hand-off and crosslink initiation and termination procedures are governed by hand-off schedules determined in accordance with the method described in conjunction with FIG. 4. In an alternate embodiment, hand-off and crosslink starting procedures could be performed in real-time after PSSP establishment.

In step 510, in a preferred embodiment, a determination is made whether the PSSP stop time is reached. The PSSP stop time could be the end of the predetermined duration, or it could be the end of a repetitive period during which the PSSP is to be maintained. In an alternate embodiment, the PSSP stop time could be the result of receiving a command from a system node indicating that PSSP termination is desired. If the PSSP stop time has not been reached, then procedure 500 branches to step 508 and iterates as shown in FIG. 5. When the PSSP stop time is reached, then the PSSP is terminated in step 512, and procedure 500 continues to step 514 and ends.

Figure 6:
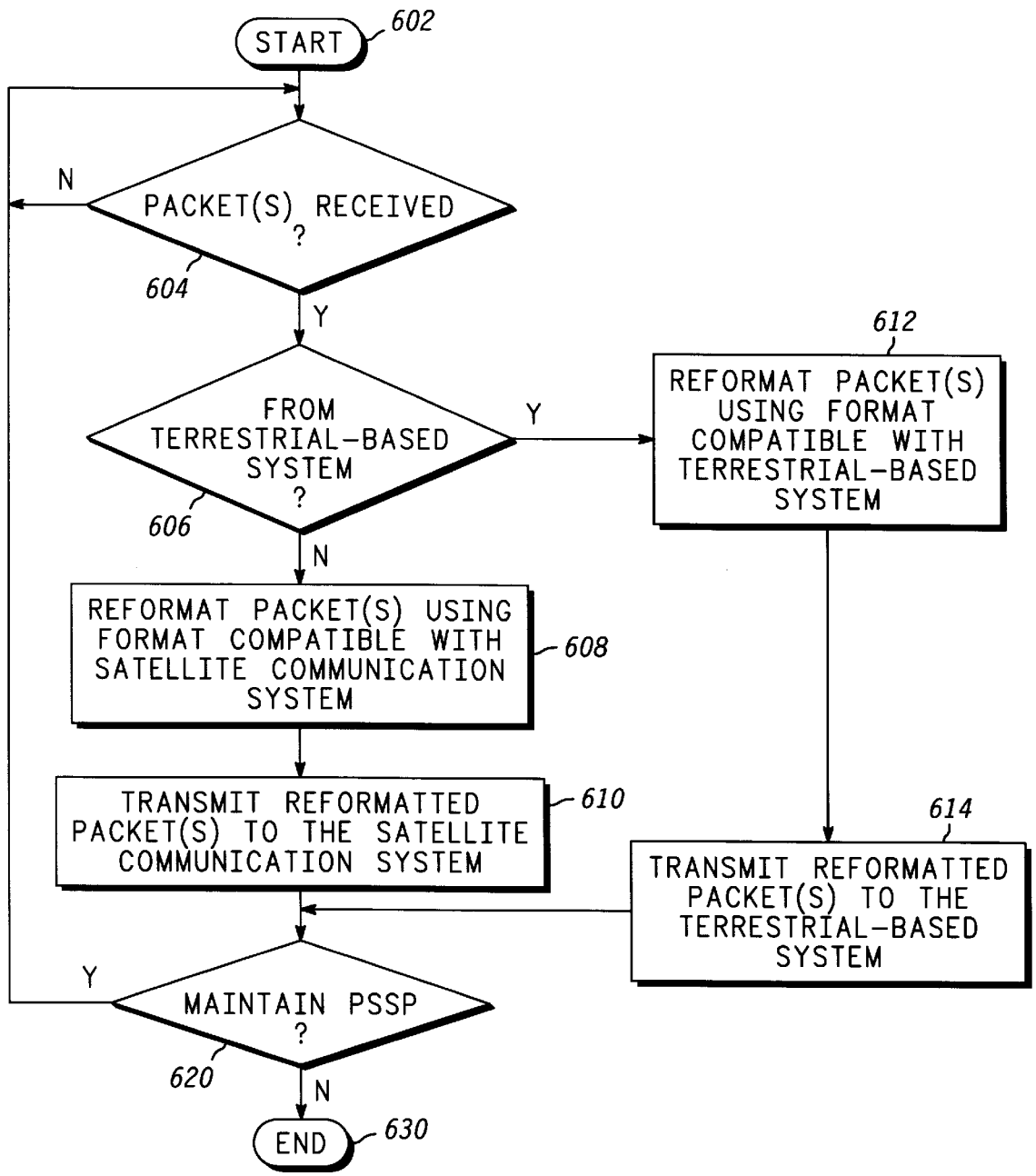
FIG. 6 illustrates a flowchart of a method for operating a terrestrial station as a component part of a PSSP within a satellite communication system in accordance with a preferred embodiment of the present invention.

FIG. 6 illustrates a flowchart of a method for operating a terrestrial station as a component part of a PSSP within a satellite communication system in accordance with a preferred embodiment of the present invention. Procedure 600 starts with step 602. Procedure 600 could be initiated when a terrestrial station powers up, and/or could be initiated at periodic intervals. Alternatively, procedure 600 could be initiated when a non-system compatible user initiates a call and/or sends a message to another compatible or non-compatible user. In this case, one or both of the non-compatible users are linked to the communication system via network translators.

After a PSSP is established, in step 604, a query is performed to determine whether the network translator has received one or more packets. These packets can be received via terrestrial-based system transceiver 220 (FIG. 2) or via satellite communication system transceiver 240 (FIG. 2), or via interface unit 270. As long as a data packet has not been received, procedure 600 continues to perform step 604. When at least one data packet is received, procedure 600 branches to step 606.

In a preferred embodiment, a terrestrial station responds to terminals which it identifies as registered users. In a preferred embodiment, a list of registered users is contained within each terrestrial station so that it can make local access decisions. In an alternate embodiment, the terrestrial station cooperates with the communication system to determine access privileges. In another alternate embodiment, the terrestrial station sends a reply message back to the source terminal when access is denied.

When packets are received, a destination point with the satellite communication system is also identified. The destination point can be a subscriber unit, a system gateway, or terrestrial station. Each of these destination points can be identified, for example, using one of the satellites as a termination point in the constellation.

In a preferred embodiment, a destination point is correlated with a list of PSSPs. Desirably, each terrestrial station has identified a source and destination terminal with every predetermined PSSP that it is supporting at a particular time, although this is not crucial.

In one alternate embodiment, a non-compatible terminal can place a call to a system compatible terminal. In this case, the network translator in cooperation with its controlling terrestrial station determines a location for the system compatible user. The call setup procedure to a system compatible user terminal is performed.

In another alternate embodiment, a non-compatible terminal can place a call to another non-compatible terminal. In this case, the network translator in cooperation with its controlling terrestrial station determines a location for the destination non-compatible user. A destination terrestrial station is identified for the destination non-compatible user. A terrestrial station-to-terrestrial station call setup procedure is performed. In this case, a transient PSSP is established. Transient PSSPs have variable durations which require more system resources to establish and maintain.

In step 606, a query is performed to determine whether the packets have been received from a terrestrial-based system transceiver. If necessary, the received packets are decrypted. When the packets are from a terrestrial-based system transceiver, then procedure 600 branches to step 608. When the packets are not from a terrestrial-based system transceiver, then procedure 600 branches to step 612. In alternate embodiments, packets could be received from a user interface or other type of interface unit. Terrestrial stations also send some packets generated internally during normal operations to at least one control center in the communication system.

In step 608, the network translator reformats the packets so that the reformatted packets can be transmitted to one of the satellites in the satellite communication system. Upon receipt, the packets received from the terrestrial-based system are in a terrestrial-based system compatible format. These packets are reformatted into a format which is compatible with the satellite communication system so that they can be transmitted to a destination point using the satellites. In establishing a PSSP, at least one link between a network translator and a non-compatible communication terminal is established.

In an alternate embodiment, where the packet is to be sent over a terrestrial link to the destination terrestrial station, no translation may be necessary, or the packet cold be translated to a format appropriate for the terrestrial station-to-terrestrial station link.

In step 610, in a preferred embodiment, the terrestrial station transmits the reformatted packets to one of the satellites in the satellite communication system. Procedure 600 continues with step 620, described below.

In step 612, the network translator reformats the packets so that the reformatted packets can be transmitted to at least one of the user terminals. Upon receipt, the packets received from the satellite communication system are in a satellite communication system compatible format. These packets are reformatted into a format which is compatible with the terrestrial-based system so that they can be transmitted to a destination terminal. In an alternate embodiment, where the packet is received over a terrestrial link, the network translator translates the packet, if necessary, into a format appropriate for transmission to the destination terminal.

In step 614, the terrestrial station transmits the reformatted packets to at least one of the user terminals in the terrestrial-based system. Procedure 600 continues with step 620.

In step 620, a terrestrial station determines if the links that it is maintaining should be discontinued. When links are discontinued, network translator resources can be re-allocated to other PSSPs. In an alternate embodiment, the network translator determines billing information for the PSSPs which it establishes. If the PSSP is to be maintained, the procedure iterates as shown in FIG. 6. Otherwise, in step 630, procedure 600 ends.

Figure 7:
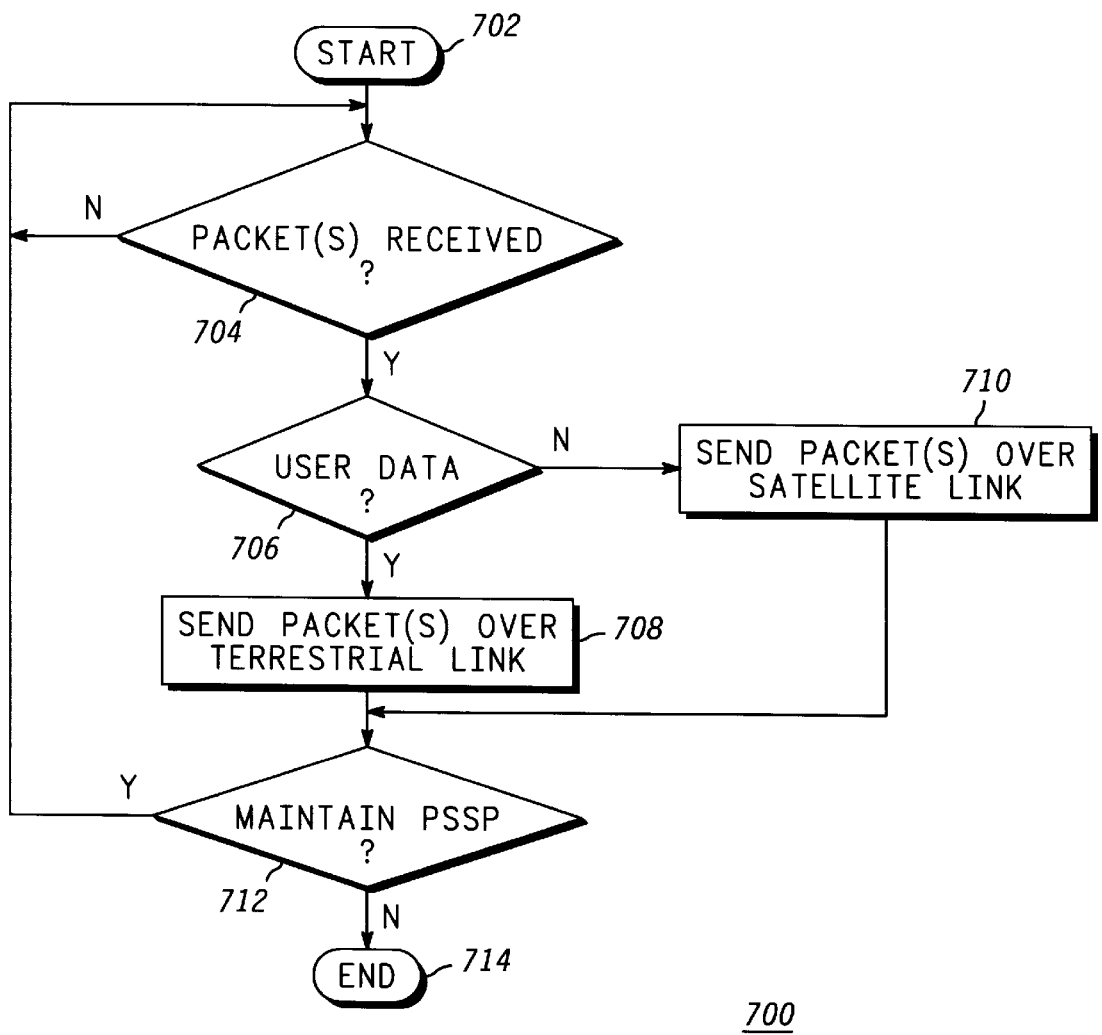
FIG. 7 illustrates a flowchart of a method for providing a PSSP within a satellite communication system in accordance with an alternate embodiment of the present invention.

FIG. 7 illustrates a flowchart of a method for providing a PSSP within a satellite communication system in accordance with an alternate embodiment of the present invention. Procedure 700 starts with step 702. In step 704, a determination is made whether one or more packets are received. If not, the procedure iterates as shown.

If one or more packets are received, a determination is made in step 706 whether the packets are user data packets, as opposed to overhead packets. If the packets are user data packets, then step 708 is performed, where the packets are sent over a terrestrial link to the destination terrestrial station. If the packets are not user data packets, then step 710 is performed, where the packets are sent over a satellite link to the destination terrestrial station.

In step 712, a terrestrial station determines if the links that it is maintaining should be discontinued. If the PSSP is to be maintained, the procedure iterates as shown in FIG. 7. Otherwise, in step 714, procedure 700 ends.

In summary, the method and apparatus of the present invention enable Private Secondary Service Paths (PSSPs) to be established between compatible or non-compatible user terminals using a satellite communication system. PSSPs allow users to transfer data and/or message packets via secondary service paths which are established using at least one terrestrial station (network translator) and communication satellites. While the principles of the invention have been described above in connection with specific apparatus, it is to be clearly understood that this description is made only by way of example and not as a limitation on the scope of the invention.

For example, although the description describes a system using LEO satellites, Medium-Earth Orbit satellites, Geostationary satellites, or satellites in other orbits could also or alternatively be used. Any combination of satellites in different orbits could be used for the establishment and maintenance of a PSSP. In addition, the sequence and serial execution format of the method steps described in conjunction with FIGS. 4, 5, 6, and 7 could be modified into other sequences and to parallel execution formats while providing substantially equivalent results in accordance with the present invention. These and other changes and modifications which are obvious to those skilled in the art are intended to be included within the scope of the present invention.

What is claimed is:

1. A communication system for establishing a Private Secondary Service Path (PSSP) comprising:
   a first terrestrial station which is capable of maintaining a first communication channel with a source terminal and a second communication channel with a first satellite, wherein said first communication channel uses a first set of operating frequencies and a first modulation format, said second communication channel uses a second set of operating frequencies and a second modulation format; and a second terrestrial station which is capable of maintaining a third communication channel with a destination terminal and a fourth communication channel with a second satellite, wherein said third communication channel uses a third set of operating frequencies and a third modulation format, said fourth communication channel uses said second set of operating frequencies and said second modulation format, whereby said first terrestrial station and said second terrestrial station provide a first PSSP from said source terminal to said destination terminal.

2. The communication system as claimed in claim 1, wherein said first satellite and said second satellite are further capable of establishing crosslinks as necessary to maintain said first PSSP.

3. The communication system as claimed in claim 1, wherein said first satellite and said second satellite are further capable of establishing bent-pipe links as necessary to maintain said first PSSP.

4. The communication system as claimed in claim 1, wherein said first PSSP includes more than one satellite.

5. The communication system as claimed in claim 1, wherein said first terrestrial station comprises:
   a first antenna, wherein said first antenna is compatible with a first terrestrial-based system and is used to establish links with said source terminal;
   a first transceiver coupled to said first antenna, wherein said first transceiver is compatible with said first terrestrial-based system;
   a second antenna, wherein said second antenna is compatible with a satellite communication system and is used to establish links with said first satellite;
   a second transceiver coupled to said second antenna, wherein said second transceiver is compatible with said satellite communication system; and
   a processor coupled to said first transceiver and said second transceiver, said processor controlling and managing packet reception and transmission, channel set-up, radio tuning, frequency, time slot, and/or code assignment, and other communication and control functions.

6. The communication system as claimed in claim 5, wherein said second terrestrial station comprises:
   a third antenna, wherein said third antenna is compatible with a second terrestrial-based system and is used to establish links with said destination terminal;
   a third transceiver coupled to said third antenna, wherein said third transceiver is compatible with said second terrestrial-based system;
   a fourth antenna, wherein said fourth antenna is compatible with said satellite communication system and is used to establish second links with said second satellite;
   a fourth transceiver coupled to said fourth antenna, wherein said fourth transceiver is compatible with said satellite communication system; and
   a second processor coupled to said third transceiver and said fourth transceiver, said second processor for controlling and managing packet reception and transmission, channel set-up, radio tuning, frequency, time slot, and/or code assignment, and other communication and control functions.

7. The communication system as claimed in claim 6, wherein said first terrestrial-based system is Global System Mobile (GSM) compatible.

8. The communication system as claimed in claim 6, wherein said first terrestrial-based system is Code Division Multiple Access (CDMA) compatible.

9. A terrestrial station for providing Private Secondary Service Paths (PSSPs) in a satellite communication system, said terrestrial station comprising:
   a first antenna, wherein said first antenna is compatible with a terrestrial-based system and is used to establish links with a source terminal;
   a first transceiver coupled to said first antenna, wherein said first transceiver is compatible with said terrestrial-based system;
   a second antenna, wherein said second antenna is compatible with a satellite communication system and is used to establish links with at least one satellite in said satellite communication system;
   a second transceiver coupled to said second antenna, wherein said second transceiver is compatible with said satellite communication system; and
   a processor coupled to said first transceiver and said second transceiver, said processor controlling and managing packet reception and transmission, reformatting, channel set-up, radio tuning, frequency, time slot, and/or code assignment, and control functions, said terrestrial station maintaining a first communication channel with said source terminal and maintaining a second communication channel with said at least one satellite, wherein said first communication channel uses a first set of operating frequencies and a first modulation format, said second communication channel uses a second set of operating frequencies and a second modulation format.

10. The terrestrial station as claimed in claim 9, wherein said terrestrial-based system is Global System Mobile (GSM) compatible.

11. The terrestrial station as claimed in claim 9, wherein said terrestrial-based system is Code Division Multiple Access (CDMA) compatible.

12. A method for using at least one terrestrial station to allow a communication system to provide a Private Secondary Service Path (PSSP) between non-compatible subscriber units, wherein said communication system includes at least two communication satellites which are linked into said communication system, wherein said non-compatible subscriber units communicate on communication channels provided by isolated networks, said at least one terrestrial station being coupled to said communication system and being able to establish communication channels with said non-compatible subscriber units, said method comprising the steps of:
   a) establishing a first communication channel between a first subscriber unit and a first terrestrial station, said first subscriber unit being associated with a first terrestrial-based network;
   b) establishing a first terrestrial station-to-satellite channel between said first terrestrial station and a first communication satellite in said communication system;
   c) establishing at least one link from said first communication satellite to a second communication satellite in said communication system;
   d) establishing a second terrestrial station-to-satellite channel between said second communication satellite and a second terrestrial station; and
   e) establishing a second communication channel between said second terrestrial station and a second subscriber unit, said second subscriber unit belonging to a second terrestrial-based network.

13. The method as claimed in claim 12, wherein step a) further comprises the steps of:
   a1) receiving, by a terrestrial station, data from said first subscriber unit, wherein said data is formatted in a first network format and received via a first network frequency;
   a2) determining whether said first subscriber unit is permitted to use said communication system to send said data by evaluating user restriction information for said communication system; and
   a3) sending an access message to said first subscriber unit, wherein said access message indicates whether said first subscriber unit is allowed to use said communication system based on said user restriction information.

14. The method as claimed in claim 13, wherein step a) further comprises the step of:
   a4) refraining from sending said access message, when said first subscriber unit is not allowed to use said communication system.

15. The method as claimed in claim 13, wherein step a) further comprises the steps of:
   a4) identifying, by said first terrestrial station, a second subscriber unit and associated second terrestrial station;
   a5) determining whether said second subscriber unit is permitted to use said communication system to receive data by evaluating said user restriction information for said communication system, wherein said second subscriber unit is identified as being able to participate in a PSSP; and
   a6) sending a second access message to said first subscriber unit, wherein said access message indicates whether said second subscriber unit is allowed to use said communication system.

16. The method as claimed in claim 13, wherein step b) further comprises the steps of:
   b1) creating reformatted data by reformatting said data using a format compatible with said communication system, when said access message indicates said first subscriber unit is allowed to use said communication system; and
   b2) transmitting said reformatted data to said communication system using at least one communication channel provided by said first communication satellite.

17. The method as claimed in claim 16, wherein step b) further comprises the step of:
   b3) processing said data as CDMA data when said first terrestrial-based network is a CDMA compatible network.

18. The method as claimed in claim 16, wherein step b) further comprises the step of:
   b3) processing said data as GSM compatible data when said first terrestrial-based network is a GSM compatible network.

19. The method as claimed in claim 16, wherein step c) further comprises the step of:
   c1) sending said reformatted data from said first communication satellite to said second communication satellite using routing table information stored in said at least two communication satellites.

20. The method as claimed in claim 19, wherein step d) further comprises the step of:
   d1) receiving, by said second terrestrial station, said reformatted data from said second communication satellite.

21. The method as claimed in claim 20, wherein step e) further comprises the steps of:
   e1) creating re-reformatted data by reformatting said reformatted data using a format compatible with said second subscriber unit; and
   e2) transmitting, by said second terrestrial station, said re-reformatted data to said second subscriber unit using a communication channel within said second terrestrial-based network.

22. The method as claimed in claim 21, wherein step e1) further comprises the step of:
   creating said re-reformatted data as CDMA data when said second terrestrial-based network is a CDMA compatible system.

23. The method as claimed in claim 21, wherein step e1) further comprises the step of:
   creating said re-reformatted data as GSM compatible data when said second terrestrial-based network is a GSM compatible system.

24. In a satellite communication system which comprises a plurality of satellites, a method for establishing a Private Secondary Service Path (PSSP) between non-compatible communication terminals using said plurality of satellites for a length of time, said method comprising the steps of:
   identifying at least one PSSP between a first non-compatible communication terminal and a second non-compatible communication terminal, wherein said PSSP includes links supported by at least one terrestrial station coupled to at least one of said plurality of satellites;
   determining a duration for said PSSP, wherein said duration defines the length of time for a data transfer session between said first non-compatible communication terminal and said second non-compatible communication terminal;
   establishing said PSSP at a start time of said duration; and
   maintaining said PSSP for said duration.

25. The method as claimed in claim 24, wherein said establishing step further comprises said steps of:
   establishing a first link between a first terrestrial station and said first non-compatible communication terminal, said first terrestrial station for translating carrier frequencies and for reformatting packets between said first non-compatible communication terminal and a first satellite in said plurality of satellites;
   establishing a second link between a second terrestrial station and said second non-compatible communication terminal, said second terrestrial station for translating carrier frequencies and for reformatting packets between said second non-compatible communication terminal and a second satellite in said plurality of satellites; and
   establishing a link between said first satellite and said second satellite, whereby said first non-compatible communication terminal is connected through said PSSP to said second non-compatible communication terminal.

26. The method as claimed in claim 25, wherein said maintaining step further comprises said steps of:
   making hand-offs between said first terrestrial station and said plurality of satellites;
   making hand-offs between said first terrestrial station and said first non-compatible communication terminal;
   making hand-offs between said second terrestrial station and said plurality of satellites; and making hand-offs between said second terrestrial station and said second non-compatible communication terminal, wherein said hand-offs are made to maintain said PSSP for said duration.

27. In a satellite communication system which comprises a plurality of satellites and a plurality of terrestrial stations coupled to said plurality of satellites, wherein at least one of said plurality of satellites and at least two of said plurality of terrestrial stations are used to establish a Private Secondary Service Path (PSSP) between non-compatible communication terminals, a method for operating a satellite comprising the steps of:

establishing a secondary service link between said satellite and a terrestrial station, said secondary service link being a first portion of said PSSP between a first non-compatible communication terminal and a second non-compatible communication terminal, said PSSP being a path which said satellite communication system maintains for a duration which defines a length of time of a data transfer session between said first non-compatible communication terminal and said second non-compatible communication terminal;

maintaining said secondary service link for at least a portion of said duration; and handing-off said secondary service link in order to continue maintenance of said secondary service link.

28. A communication system comprising:

a first terrestrial station for communicating with a first terminal, a source satellite, and a second terrestrial station via a terrestrial link; and said second terrestrial station for communicating with a second terminal, a destination satellite, and said first terrestrial station, wherein after communications is established between said first terminal and said second terminal over a satellite link including said source satellite and said destination satellite, user data is sent over said terrestrial link and overhead data is sent over said satellite link.

29. The communication system as claimed in claim 28, wherein said terrestrial link includes at least one public switched telephone network.

30. The communication system as claimed in claim 28, wherein said satellite link includes at least one crosslink.

31. The communication system as claimed in claim 28, wherein said satellite link includes at least one bent-pipe link.

* * * * *